United States Patent
Barmettler

(10) Patent No.: US 6,981,213 B2
(45) Date of Patent: Dec. 27, 2005

(54) PRINTING A WELL-DEFINED SUBSET OF AN HTML PAGE

(75) Inventor: James W. Barmettler, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 781 days.

(21) Appl. No.: 09/916,755

(22) Filed: Jul. 26, 2001

(65) Prior Publication Data

US 2003/0023630 A1 Jan. 30, 2003

(51) Int. Cl.[7] .......................................... G06F 17/00
(52) U.S. Cl. .................................................... 715/513
(58) Field of Search ........................... 715/513, 501.1; 707/3; 358/1.18

(56) References Cited

U.S. PATENT DOCUMENTS

| | | | |
|---|---|---|---|
| 5,991,514 A | 11/1999 | Nielsen | |
| 6,185,588 B1 * | 2/2001 | Olson-Williams et al. | 715/515 |
| 6,222,634 B1 | 4/2001 | Dubbels et al. | |
| 6,320,671 B1 | 11/2001 | Kelley et al. | |
| 6,560,621 B2 * | 5/2003 | Barile | 715/513 |
| 2002/0135800 A1 * | 9/2002 | Dutta | 358/1.15 |
| 2002/0184305 A1 * | 12/2002 | Simpson et al. | 709/203 |
| 2003/0035144 A1 * | 2/2003 | Shima | 358/1.18 |

OTHER PUBLICATIONS

"Basics of Server-Side JavaScript, Chapter 4", Oct. 30, 1997 http://www.astro.uni-bonn.de/~webstw/cm/ns_js_ssa/jsserv.htm.*

* cited by examiner

Primary Examiner—Stephen Hong
Assistant Examiner—Adam M. Queler

(57) ABSTRACT

The present invention provides a method and system for selectively printing a desired portion of a web page. In one embodiment of the method, the steps typically include passing a named tag element for the desired portion into the desired portion of the web page, querying the named tag element for an inner Hyper-Text Markup Language block for the desired portion, opening a browser window, creating a stream of text for the desired portion and sending the stream of text to the browser, and activating printing, by the browser, of the stream of text. By sending the stream of text to a separate browser window for printing using, for example, JavaScript® or another suitable scripting language, installation of plug-ins, executables or ActiveX® controls is avoided, increasing the efficiency of the printing process.

16 Claims, 4 Drawing Sheets

PRINTING A WELL-DEFINED SUBSET OF AN HTML PAGE

FIELD OF THE INVENTION

The invention relates generally to printing materials found on web pages and, more particularly, to printing selected portions of materials from web pages.

BACKGROUND OF THE INVENTION

Use of the Internet and various Intranets continues to grow, especially the use of web-based networks. The web-based networks utilize Hyper-Text Transfer Protocol (HTTP) and the Hyper-Text Markup Language (HTML). In particular, the World Wide Web is a system of Internet servers that support specially formatted documents that are formatted in a language called HTML. Applications called browsers are used to access the World Wide Web. Documents or other resources on the World Wide Web are called web pages. Each web page is identified by a unique Uniform Resource Locator (URL), which is a global address of the document or other resource.

HTTP is a stateless protocol that web clients and web servers use to communicate between themselves using hyperlinks. The terminology "stateless" means that the protocol does not have information about what occurred previously, i.e., does not retain the configuration settings used previously. Thus, each web page is processed without any knowledge of the previous pages requested. HTTP defines how messages are formatted and transmitted and what actions web servers and browsers are to take in response to various commands. HTML is the language used by the web servers for creating and connecting together documents that contain the hyperlinks. HTML defines the structure and layout of a web document by using predefined tags and attributes. An HTML document begins with <html><head>, after which the written text is entered, and then concludes with </body></html>. An HTML file is a text file containing small markup tags. An HTML file must have an htm or html file extension, and may be created using a simple text editor.

The following example shows one embodiment of a typical HTML document framework:

<html>
    <head>
    </head>
    <title> Title of page </title>
    <body>
    Text information
    </body>
    <html>

In this example, the first markup tag, sometimes referred to simply as a "tag," is <html>. The tags are not case-sensitive. At the present time, generally uppercase tags are used, but the World Wide Web Consortium (W3C) has recommended that lowercase tags be used. In addition, the next generation of HTML (XHTML) demands lowercase tags. Hence, lowercase tags are used herein. The <html>tag indicates to the browser that an HTML document is being started. The last tag in the document is </html>, which indicates to the browser that this is the end of the HTML document. A header tag, <head>, may follow the <html> tag. Text placed between the <head> tag and a </head> tag is header information, i.e., information about the document which is not displayed in the browser window. Next, a title may be inserted between a title tag, <title>, and an end-of title tag, </title>, and the text between the two title tags will be displayed in the browser window. Text information is inserted between the tags <body> and </body>.

Using HTTP and HTML allows users to send text and graphical information that has hyperlinks. Hyperlinks are network addresses that are embedded in a word, a phrase, an icon, a graphical image or the like that are activated when the user selects the hyperlink. The hyperlinks contain HTML-coded references that point to another place in the same document or to a web page for a different document, which the browser then jumps to. Hyperlinks may also be called anchors. Typically, the user clicks on the hyperlink to follow the link. Hyperlinks are essential to all hypertext systems, including the World Wide Web.

The Internet and the Intranets provide access to large amounts of information, allowing the user to download web pages and print them readily. However, such implementations may be more communication intensive than is desired since, even though a user may desire to print only part of a web page or one document of a group of documents at one web site, typically the entire document or the entire group of documents may be printed. Thus, there is a need for a method and system that allows the user the flexibility of selecting and printing the desired portion of a web page.

SUMMARY OF THE INVENTION

The present invention provides a method for selectively printing a desired portion of a web page without the necessity of printing other portions of a web page along with the desired portion. The invention allows for a print to take place without an additional request to the web server for a "print friendly" version of the document, thus not requiring extra bandwidth. Additionally, there is no need to attach hidden data to the document containing "print friendly" subsets of the document—all the data that is printed comes directly from the data used to create the document, thus only requiring one format to be available. Since additional print-friendly data does not have to be transferred, the end-user benefits by not having to wait for a print-friendly version to download. Content providers are thus saved bandwidth since they need not maintain two versions of content. In the preferred embodiment, the fact that some browsers can compute a text string representing all the tags that are contained within another named tag is used. A named tag is a tag with a "name" or "id" attribute. The tags within an outer tag are sometimes called the inner HTML of the outer tag. So to print a group of tags on a page, a named tag (such as a division or "div" tag) is placed around the desired tags of the web page. Then using browser application programming interfaces (APIs), the named element is queried for its inner HTML string. A new browser window is then opened, and a text stream is created from the inner HTML. Next, the stream of text is sent to the new browser window, and the new window is sent the print command. JavaScript®, for example, or any other suitable scripting language, may be used to send the stream of text to a separate browser window for printing. Activating a mechanism that can invoke a scripting function or a hyper-link on the page can invoke the inner HTML query, window creation, text streaming, and print command described above.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

The present invention solves the prior art problem of, upon selecting a web page of interest, printing the entire page or plurality of pages when only a portion of the material is desired to be printed. The portion of the web page or pages to the printed is marked using markup tags, and then JavaScript® or any other suitable scripting language is used to send the HTML within the markup tags to a separate browser window for printing. In this manner, the user is not forced to print navigation bars, privacy statements, legal language, links and advertising that may not be of interest. When a content provider must maintain a "printable" version of material at the site as well as the HTML version, higher costs are incurred. By not requiring that a separate file be maintained at the web site containing the contents of individual portions that may be printed, the present invention avoids requiring downloading the new "printable" content to the user's computer before printing, avoids requiring downloading or installing plug-ins or executables or special controls, and allows pre-selected portions of a page to be printed.

Figure 1:
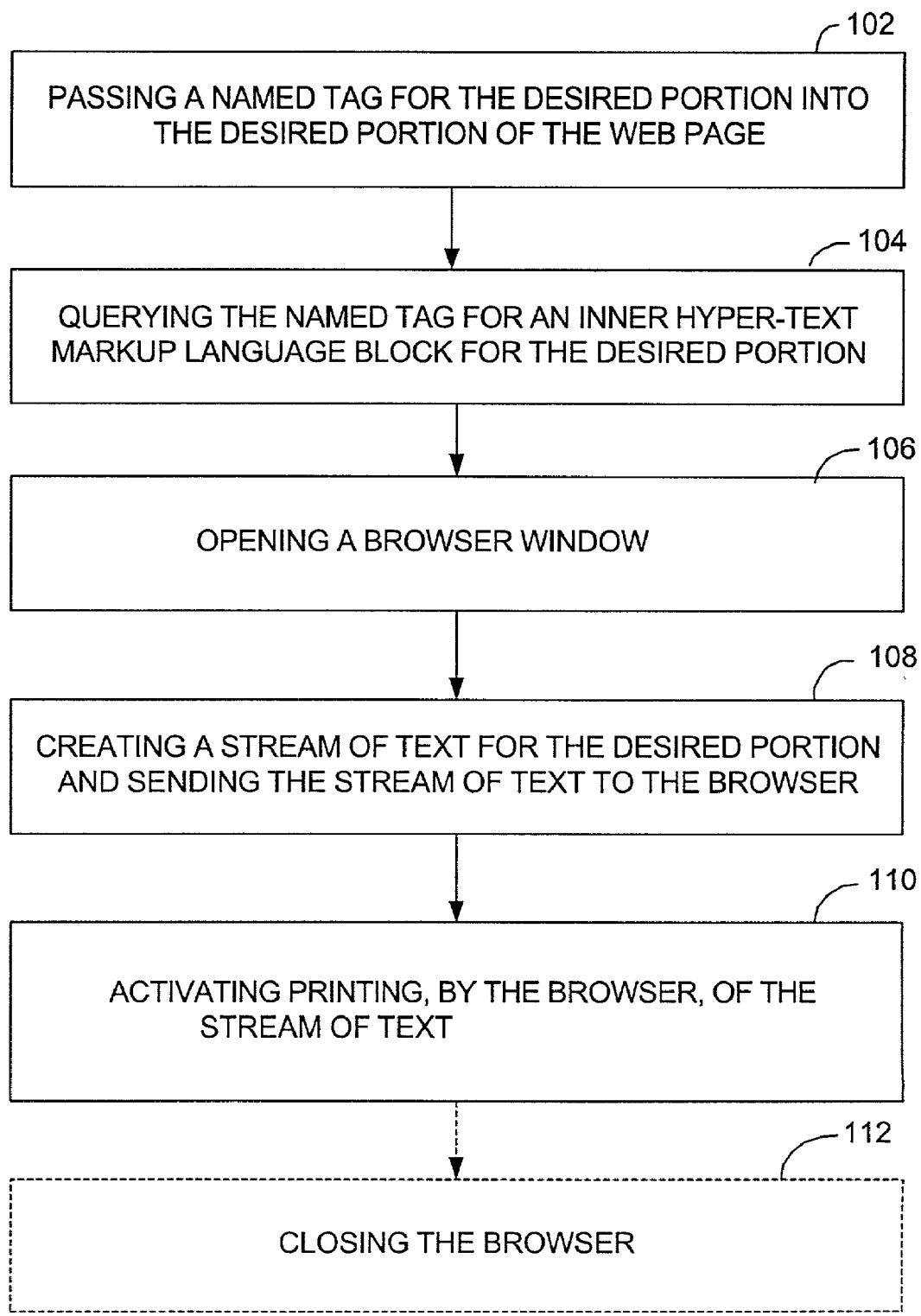
FIG. 1 is a flowchart showing one embodiment of steps of a method in accordance with the present invention.

In one embodiment of a method in accordance with the present invention, shown in FIG. 1, a desired portion of a web page is selectively printed by a user. First, a named tag element for the desired portion is passed 102 into the desired portion of the web page. The named tag element, for example a division element, is used to define what is included in the browser window, that is, the desired portion for printing. Typically, the named tag element is identified with an identification attribute such as a name for the desired portion of the web page. Next, the named tag element is queried 104 for an inner Hyper-Text Markup Language block for the desired portion. A browser window to which the desired portion of the web page is to be sent is then opened 106. A stream of text is created 108 for the desired portion and is sent to the browser. Then printing of the stream of text for the desired portion is activated 110 by the browser. When printing has been completed, the browser may be closed 112 (an optional step shown by dashed lines).

Typically, JavaScript® or any other suitable scripting language may be used to send the stream of text to a separate browser for printing, so that downloading of the content directly to the user's computer is avoided and greater efficiency is achieved. In this manner, the necessity of using plug-in routines, executable programs or ActiveX® controls is also avoided, thus making the printing a more efficient process.

Figure 2:
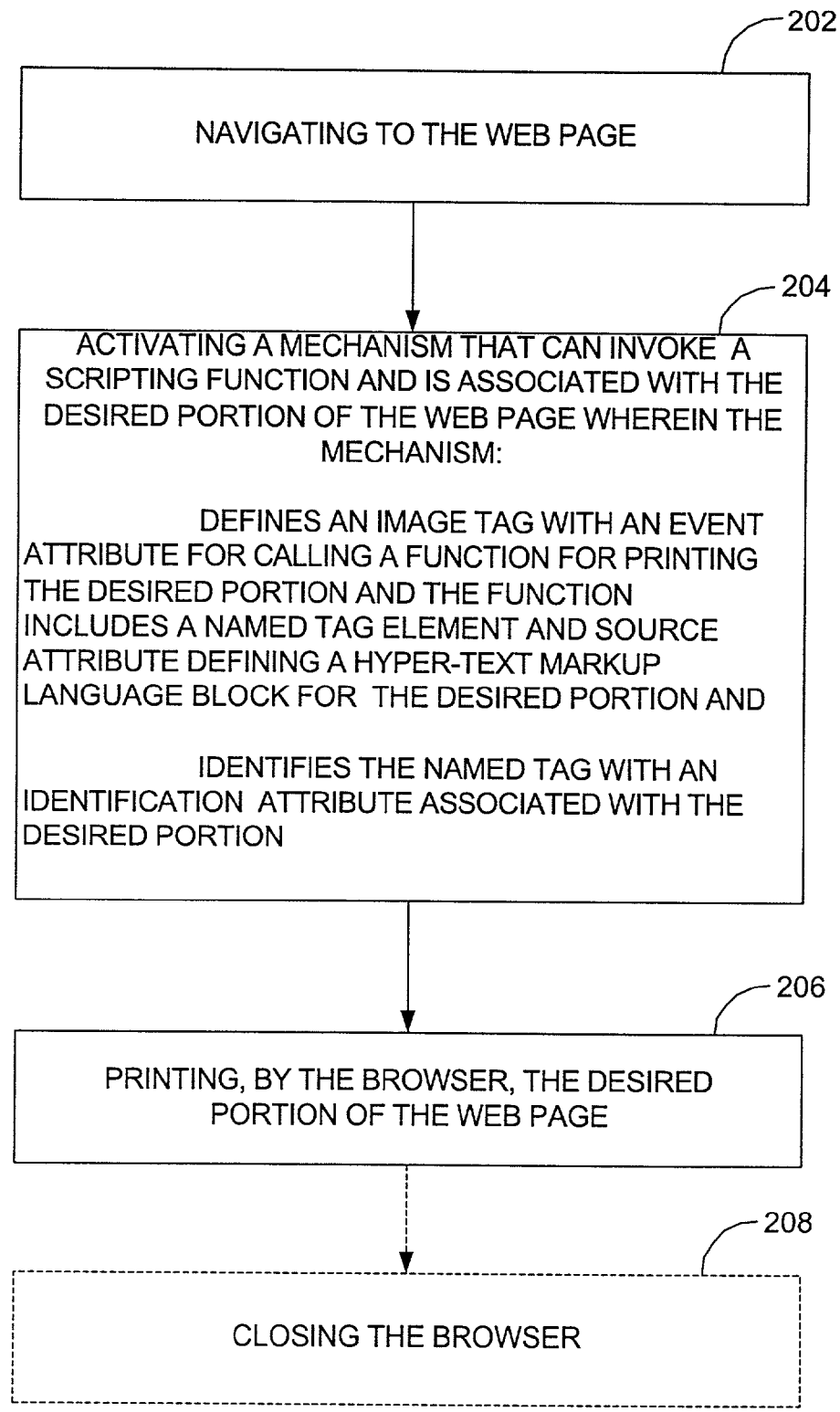
FIG. 2 is a flowchart showing another embodiment of steps of a method in accordance with the present invention.

As shown in FIG. 2, in another embodiment of the method of the present invention, selective printing of a desired portion of a web page is accomplished by navigating 202 to the web page and activating 204 a mechanism that can invoke a scripting function and is associated with printing of the desired portion of the web page. The mechanism defines an image tag with an event attribute that is used for calling a function for printing the desired portion. The function generally includes a named tag element and source attribute defining a Hyper-Text Markup Language block for the desired portion. The mechanism identifies the named tag with an identification attribute that is associated with the desired portion, for example, a name of the desired portion such as SPORTS or WEATHER.

When the mechanism is activated, the desired portion of the web page is printed 206 by the browser. Where desired, after printing is completed by the browser, the browser may be closed 208 (This optional step is shown by a dashed line). As discussed above, JavaScript® or any other suitable scripting language may be used to send the stream of text to a separate browser window for printing, thus eliminating the need for downloading additional content to a user's computer, installing plug-in routines, installing executable programs, or installing ActiveX® controls.

Figure 3:
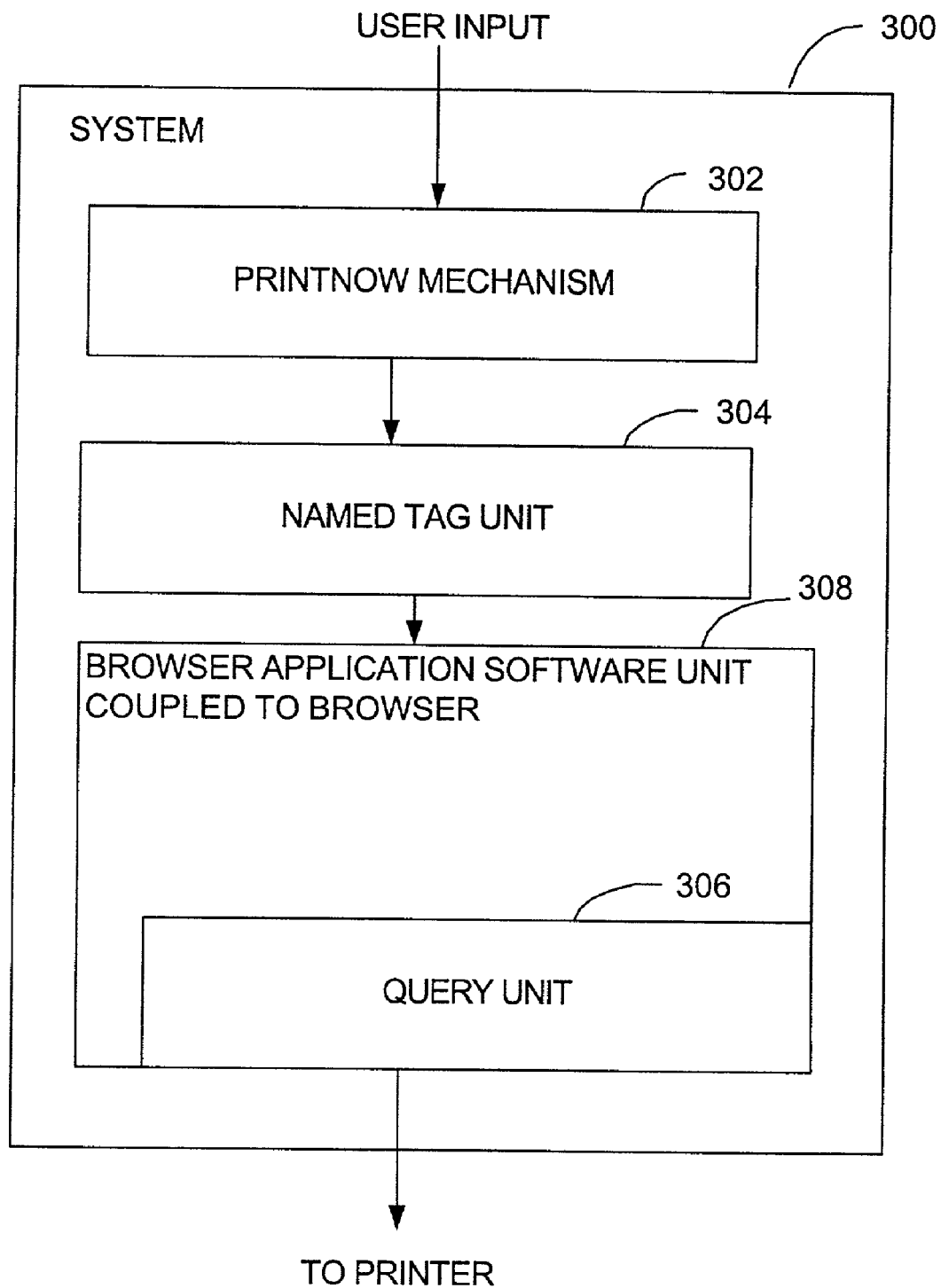
FIG. 3 is a block diagram of one embodiment of a system in accordance with the present invention.

As shown in FIG. 3, the present invention provides a system for selectively printing a desired portion of a web page. The system 300 typically includes a PrintNow mechanism 302 that can invoke a scripting function, a named tag unit 304, and a browser application software unit 308 that contains a query unit 306. When the PrintNow mechanism 302 is activated, such as when the user clicks a cursor on a PrintNow mechanism, selects a link or speaks to a voice-activated mechanism for invoking the scripting function, the PrintNow mechanism 302 calls up a print function for the desired portion of the web page. The named tag unit 304 is arranged to surround HTML that defines the desired portion of the web page and passes a tagged element for the desired portion into another web page. The query unit 306, which is coupled to the named tag unit 304, queries the tagged element 304 so that it can obtain an inner Hyper-Text Markup Language block that indicates the desired portion Control of a browser is accomplished using the browser application software unit 308, which is used, for example, to open a browser window. A streaming unit 310 is coupled to the browser application software unit 308 and creates a stream of text for the desired portion of the web page. Then, the streaming unit 310 sends the stream of text to the browser, activating printing of the stream of text. Where desired, when printing is completed by the browser, the browser application software unit may also close the browser.

As described above, the streaming unit 310 may utilize JavaScript® or any other suitable scripting language to send the stream of text to a separate browser window for printing to avoid the need for downloading additional content to a user's computer, installing plug-in routines, installing executable programs, or installing ActiveX® controls.

Figure 4:
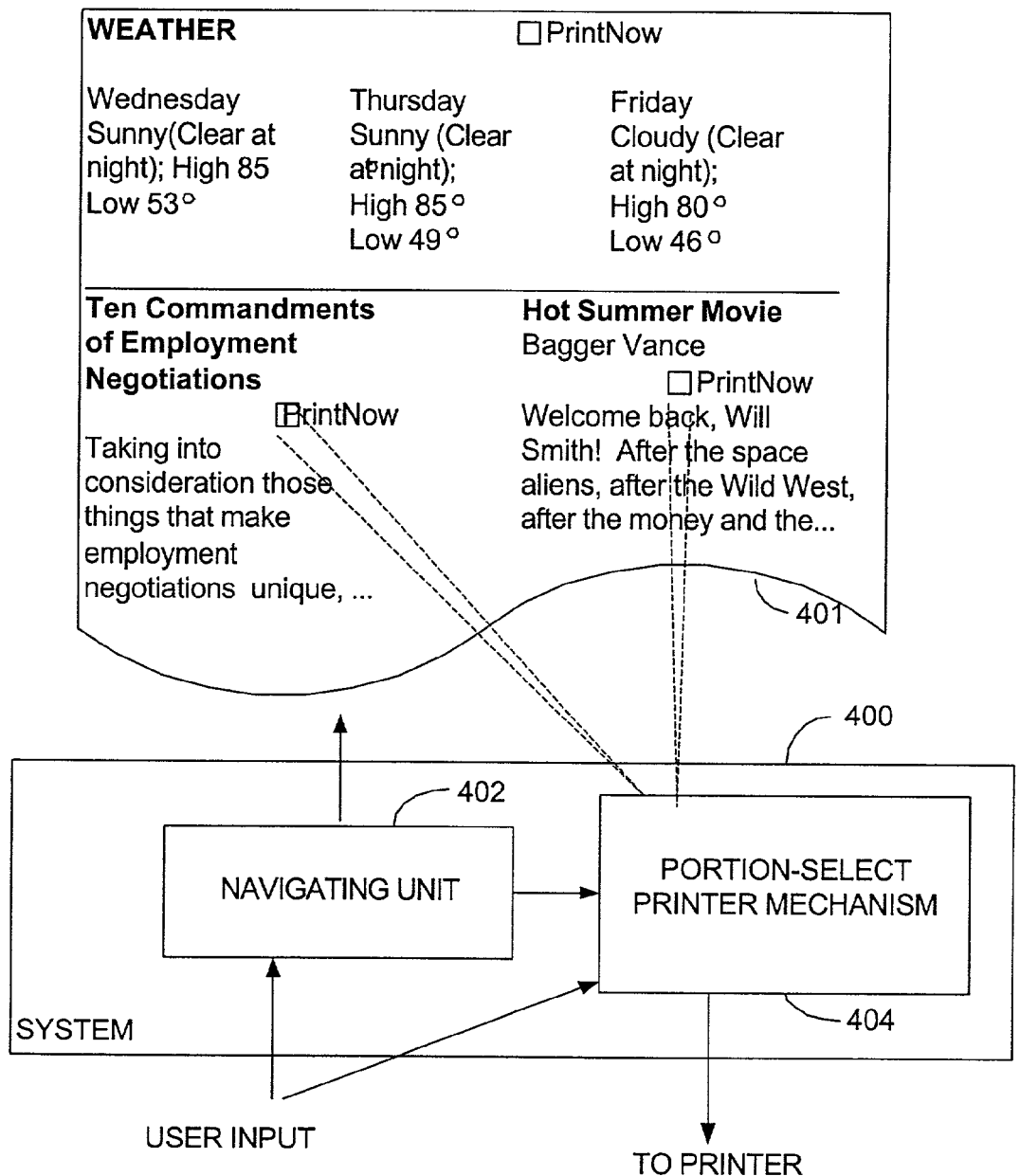
FIG. 4 is a block diagram of another embodiment of a system in accordance with the present invention.

In another embodiment, as shown in FIG. 4, a system 400 for selectively printing a desired portion of a web page 401 in accordance with the present invention includes a navigating unit 402 and a portion-select printer mechanism 404 for invoking a scripting function. When the navigating unit 402 receives a request from a user to navigate to the web page 401, the unit navigates to the web page 401. Then, when the user activates the portion-select printer mechanism 404 that can invoke the scripting function associated with the desired portion of the web page 401, an activation signal implements an image tag that is defined with an event attribute for calling a function for printing the desired portion. The function typically includes a named tag element and source attribute that defines a Hyper-Text Markup Language block for the desired portion of the web page 401 so that the desired portion may be readily printed. In addition, the PrintNow mechanism 404 identifies the named tag with an identification attribute that is associated with the selected portion. When the browser receives the activation signal, the print function causes the desired portion of the web page 401 to be printed. After the desired portion is printed, the browser is typically closed.

Generally, the activation signal sent by the portion-select printer mechanism can invoke the scripting function and activates a streaming unit that uses JavaScript® or any other suitable scripting language to send the stream of text to a separate browser window for printing. By using JavaScript® or any other suitable scripting language to deliver the stream of text to the browser window, content does not have to be downloaded to the user's computer. Also, there is no necessity to install plug-in routines, executable programs or ActiveX® controls.

Thus, an efficient printing process for selectively printing a desired portion of a web page has been described according to the present invention. Many modifications and variations may be made to the techniques and structures described and illustrated herein without departing from the spirit and scope of the invention. Accordingly, it should be understood that the methods and systems described herein are illustrative only and are not limiting upon the scope of the invention.

What is claimed is:

1. A method for selectively printing a desired portion of a web page open in a browser window, comprising:

using at least one named tag element to mark at least one range of Hyper-Text Markup Language code of the web page representing the desired portion of the web page to be printed, wherein the named tag element is identified with an identification attribute predefined with a unique name for marking multiple ranges of Hyper-Text Markup Language code representing multiple respective desired portions of the web page to be printed;

querying the unique name of the named tag element for an inner Hyper-Text Markup Language block of code representing the desired portion of the web page to be printed;

opening another browser window;

creating a stream of text based on the named tagged element for the desired portion of the web page to be printed and sending the stream of text to the another browser window; and activating printing, by the another browser window, of the stream of text.

2. The method of claim 1 further including, after printing is completed by the browser, the step of closing the browser.

3. The method of claim 1 wherein sending the stream of text to the browser includes using a scripting language to send the stream of text to a separate browser window for printing.

4. The method of claim 1 wherein a client-side based scripting language is used to call and print the marked range of code.

5. The method of claim 1 wherein creating a stream of text for the desired portion and sending the stream of text to the browser is accomplished before the browser downloads additional content to a user's computer.

6. The method of claim 1 wherein creating a stream of text for the desired portion and sending the stream of text to the browser is accomplished before the browser installs plug-in routines.

7. The method of claim 1 wherein creating a stream of text for the desired portion and sending the stream of text to the browser is accomplished before the browser installs executable programs.

8. The method of claim 1 wherein creating a stream of text for the desired portion and sending the stream of text to the browser is accomplished before the browser installs a program control.

9. A system for selectively printing a desired portion of a web page of a browser window, comprising:

a PrintNow mechanism for invoking a scripting function, arranged to, when activated, call up a print function for printing the desired portion of the web page;

a named tag unit of the print function that is arranged to surround HTML that defines the desired portion of the web page to be printed and that is coupled to the PrintNow mechanism, wherein the named tag unit is identified with an identification attribute predefined with a unique name for marking multiple ranges of HTML code representing multiple respective desired portions of the web page to be printed;

a query unit, coupled to the named tag unit, for querying the unique name tagged element for an inner Hyper-Text Markup Language block of HTML code representing the desired portion of the web page to be printed; and a browser application software unit, containing the query unit and arranged to provide control of another browser, for opening another browser window, and for, creating a stream of text defined by the named tag unit for the desired portion of the web page to be printed and sending the stream of text to the another browser, activating printing of the stream of text.

10. The system of claim 9 wherein, when printing is completed by the browser, the browser application software unit closes the browser.

11. The system of claim 9 wherein the streaming unit utilizes a scripting language to send the stream of text to a separate browser window for printing.

12. The system of claim 11 wherein the scripting function is client-side based.

13. The system of claim 9 wherein the streaming unit creates the stream of text for the desired portion and sends the stream of text to the browser before the browser downloads additional content to a user's computer.

14. The system of claim 9 wherein the steaming unit creates the stream of text for the desired portion and sends the stream of text to the browser is before the browser installs plug-in routines.

15. The system of claim 9 wherein the streaming unit creates the stream of text for the desired portion and sends the stream of text to the browser before the browser installs executable programs.

16. The system of claim 9 wherein the streaming unit creates the stream of text for the desired portion and sends the stream of text to the browser before the browser installs a program control.

* * * * *

UNITED STATES PATENT AND TRADEMARK OFFICE
CERTIFICATE OF CORRECTION

PATENT NO.         : 6,981,213 B2
APPLICATION NO.    : 09/916755
DATED              : December 27, 2005
INVENTOR(S)        : Barmettler It is certified that error appears in the above-identified patent and that said Letters Patent is hereby corrected as shown below:

Col. 6 Claim (line 48), delete "steaming" and insert therefor --streaming--.

Col. 6 Claim (line 50), between "browser" and "before", delete "is".

Signed and Sealed this

Twelfth Day of December, 2006

JON W. DUDAS
*Director of the United States Patent and Trademark Office*